(12) United States Patent
Lederman et al.

(10) Patent No.: US 7,256,933 B2
(45) Date of Patent: Aug. 14, 2007

(54) MULTI-PURPOSE OPTICAL CORRECTOR SYSTEM

(76) Inventors: Russell Drew Lederman, 100 Pinehurst Rd., Berlin, MD (US) 21811; Clamore William Dankmeyer, III, 128 Teal Cir., Berlin, MD (US) 21811

( * ) Notice: Subject to any disclaimer, the term of this patent is extended or adjusted under 35 U.S.C. 154(b) by 108 days.

(21) Appl. No.: 10/737,996

(22) Filed: Dec. 17, 2003

(65) Prior Publication Data

US 2004/0150882 A1    Aug. 5, 2004

Related U.S. Application Data

(60) Provisional application No. 60/445,423, filed on Feb. 7, 2003, provisional application No. 60/433,871, filed on Dec. 17, 2002.

(51) Int. Cl.
*G02B 23/00* (2006.01)
(52) U.S. Cl. ....................... 359/423; 359/399
(58) Field of Classification Search ............... 359/425, 359/399, 422, 423
See application file for complete search history.

(56) References Cited

U.S. PATENT DOCUMENTS 4,600,277 A * 7/1986 Murray, Jr. ................. 359/423
5,959,770 A * 9/1999 Perkins et al. .............. 359/422
6,005,711 A * 12/1999 Mai et al. .................... 359/424

* cited by examiner

*Primary Examiner*—Joshua L Pritchett
(74) *Attorney, Agent, or Firm*—Lawrence C. Edelman, Esq.

(57) ABSTRACT

An optical corrector system optical system comprising two components, a first housing supporting therein a telenegative-type lens, and a second housing supporting therein a positive-type lens. The first housing is adapted to be coupled to a telescope in a manner so that the telenegative lens intercepts the image plane provided by the telescope. The second housing is adapted to be coupled to an image input portion of a remote viewing device. Opposite ends of the first and second housings are adapted to be coupled to each other in a manner so that the distance between the telenegative lens in the first housing and the positive lens in the second housing results in the intercepted image plane being repositioned from a viewing position at the telescope, to a viewing position at the remote viewing device. In a preferred embodiment, the remote viewing device comprises a binocular viewer.

18 Claims, 5 Drawing Sheets

MULTI-PURPOSE OPTICAL CORRECTOR SYSTEM

CROSS-REFERENCE TO RELATED APPLICATIONS

This application claims priority under 35USC 120 of U.S. Provisional Patent Application No. 60/433,871 filed Dec. 17, 2002, entitled "Multi-Purpose Optical Corrector System", and claims priority under 35USC 120 of U.S. Provisional Patent Application No. 60/445,423 filed Feb. 7, 2003 entitled "Focal Reducer For Binoviewer". The entire disclosure of these patent applications are incorporated herein by reference in their entirety.

BACKGROUND OF THE INVENTION

1. Field of the Invention

The present invention relates to an apparatus for connecting a remote viewer (such as binoviewer or camera) to a telescope, and more specifically, a modular, multi-purpose, optical system that can be used with several different types of telescopes, which brings the focal plane of the telescope out to the remote viewer without requiring altering of the telescope, and without excessive magnification.

2. Description of the Prior Art

The use of a telescope for viewing astronomical objects such as stars and nebulae is conventionally undertaken with one eye. Accordingly, the design of any particular type of telescope is usually optimized for this type of viewing. In Newtonian Telescopes, "Optimization" refers to configuring the optical components of the telescope so that aberrations are minimized. The result of this optimization is that the focal plane created by the optical components, such as the primary and secondary mirrors, will fall at a point within the focusing tube where a single eyepiece may intercept and create an image, which may then fall upon the viewer's retina so that a user of the telescope can see the image. However, if a remote viewing accessory such as a binocular viewer (hereinafter called a "binoviewer") is placed in the focusing tube, and eyepieces are then placed in the binoviewer, these eyepieces will be as much as 150 mm further from the focal plane created by the optical components of the telescope.

In the prior art, in an attempt to correct for this, a single tele-negative lens (sometimes called a relay or Barlow lens) system, was used so that the focal length of the optical system inherent to that particular telescope would be increased. Since the tele-negative system could intercept the light cone and then increase the distance where the light cone terminates in the form of a focus, this "increased distance" focal plane can now be intercepted by the eyepieces that are placed in a binoviewer. However, there is a serious price to be paid with this prior art technique. That is, because a tele-negative lens produces a more slowly converging light cone, the longer the light cone traveled after passing through the telenegative lens, the more of an increase in magnification will occur. Thus, the use of a tele-negative lens alone in order to adapt the focusing ability to a remote viewing device such as a binoviewer would create very high magnification, even if low power eyepieces are used in the binoviewer. Since many astronomical objects are best viewed with low power because of their large size and low surface brightness, the lack of this low power viewing option restricted the use of a binoviewer to viewing brighter objects where high power was desirable such as The Moon or Planets.

Although it is also known that a positive lens could be used in conjunction with a housing that holds the tele-negative lens, such a technique results in a light path correction component that is unique and unchangeable for the particular telescope it is designed to work with. Quite often amateur astronomers have more than one type of telescope, and it would be desirable that their binoviewer be adaptable for use/operation with their other telescopes. Additionally, it would be desirable that the binoviewer be able to provide different levels of image magnification.

One option used in the prior art to counteract this magnification effect in a Newtonian (reflecting) telescope is to decrease the distance between the primary mirror and the secondary mirror. This can be accomplished in several ways, however, when this is done by any means, the secondary mirror must then reflect the converging light cone reflected from the primary mirror at a point where this light cone is wider. Therefore, the use of a larger secondary must be implemented or else the true used aperture of the primary will be reduced. Since the cost of primary mirrors is increased exponentially with diameter, this is not a commonly acceptable solution. Additionally, if the size of the secondary mirror is increased so that the entire primary is utilized, then aberrations due to the larger secondary obstruction are introduced. Even furthermore, the single eyepiece on the telescope would also require the use of an extension tube in order that it can reach focus in such a modified telescope, due to the increased back focus caused by the decreased distance between the primary and secondary mirrors. Relocating the weight of the eyepieces to a more outward location on the binoviewer creates difficulty in balancing the telescope, and is detrimental to maintaining an ease of use of such a reconfigured telescope. Therefore this solution is also considered unsatisfactory by those familiar in the art of astronomy.

With Refracting telescopes, the ability to reach focus when using an added binoviewer may not be possible, due to the conventional use of a star diagonal optical system. The star diagonal is conventionally used with a Refracting telescope since it allows the user to view the image created by the telescope at a comfortable position/angle. Although Refracting telescopes are generally configured to allow for the extra light path caused by the use of a star diagonal, their configuration generally does not allow for the even greater light path which results when a binoviewer is added after the star diagonal. Accordingly, when a binoviewer is used with a Refractor telescope having a star diagonal, an optical corrector system would be needed to compensate for this additional back focus requirement. One solution in the past has been to use the binoviewer without a star diagonal, that is, by attaching the binoviewer directly in line with the telescope lenses (however, most Refractors still cannot bring the focal plane out to the eyepieces of a binoviewer even in the absence of a star diagonal). Even if the focus requirement was met, although this technique may be satisfactory for viewing objects very low on the horizon, it would still provide an unsatisfactory viewing position/angle for viewing anything higher than 30-40 degrees above the horizon. Since it is known that the steadiest atmospheric conditions occur higher than 45 degrees from the horizon, this solution is also not acceptable. Because Refractor type telescopes are very expensive, and owners of such instruments are concerned with resale value, a second solution which involves physically shortening the length of the refractor tube is also not an acceptable solution. Even furthermore, if the focuser tube of a Refracting telescope were placed closer to the objective lens by shortening the tube length of the telescope, the converging peripheral rays created by the primary objective could also vignette or be cut off by the focuser. Refractors with fast focal ratios may be especially susceptible to this possibility due to the steep convergence of such a light cone.

OBJECTS OF THE INVENTION

Therefore, it is an object of the present invention to provide a modular optical corrector system for bringing the focal plane of a telescope out to a remote viewing device, such as the eyepieces in a binoviewer, without requiring alteration of any of the components of the telescope. It is a further object of the invention that components of the modular optical corrector system be configured robustly, so that the components can be used with various different types of telescopes, and optionally provide the user some control over the image magnification provided by the optical corrector system.

SUMMARY OF THE INVENTION

The present invention provides a means for connecting a remote viewing device, such as a binoviewer, to a telescope, and more specifically, a modular optical system that is useful in several different types of telescopes, which brings the focal plane of the telescope out to the image plane of the remote viewer, and without requiring altering of the telescope.

Furthermore, the present invention accomplishes this for telescopes that use a star diagonal as well as those that do not. Even furthermore, the present invention accomplishes this without creating excessive magnification, which is also very desirable. In accordance with the invention, magnification created by the binoviewer is now dependant only on the eyepieces used, and if the user wants low power views, low power eyepieces would provide such views because they would not yield the excessive magnification created by the use of a tele-negative lens alone as a means to bring the focal plane out to said eyepieces in said binoviewer. If higher magnification is desired, the optical system of the invention may be used in a configuration described below that will create high power views.

Accordingly, the optical system of the invention basically comprises two components, a first housing having first and second opposed ends, the first housing supporting therein a telenegative-type lens, and a second housing having first and second opposed ends, the second housing supporting therein a positive-type lens. The first end of the first housing is adapted to be coupled to a telescope in a manner so that the telenegative lens intercepts the image provided by the telescope. The first end of the second housing is adapted to be coupled to an image input portion of a remote viewing device. The second end of the first housing and the second end of the second housing are adapted to be coupled to each other in a manner so that the distance between the telenegative lens in the first housing and the positive lens in the second housing results in the intercepted image plane being repositioned from a viewing position at the telescope, to a viewing position at the remote viewing device.

The inventive modular optical system is particularly robust in that it lends itself to adaptability to a variety of different types of telescopes, such as the Newtonian, Refractor, and SCT types, for example. This is particularly advantageous for users that have more than one type of telescope, which is quite common for amateur astronomers.

Such modularity also allows a component of the optical system to be selectively used or not used in a particular viewing application, thereby resulting in a simple and previously unavailable way for the user to control the image magnification provided by the optical system which couples to the binoviewer or other viewing apparatus, such as camera.

In accordance with an improvement in accordance with this aspect of the invention, a specialized housing for the positive lens further simplifies the ability of the user to selectively change the image magnification provided by the optical system of the invention.

Even furthermore, the modularity of the invention facilitates the use of adapters, as needed, in order to adapt the housings of the optical components of the invention to the specific requirements of the telescope system of the user.

BRIEF DESCRIPTIONS OF THE DRAWINGS

The accompanying drawings, which are incorporated herein and constitute part of this specification, illustrate preferred and alternative embodiments and details of the invention, and together with the general description given above and the detailed description given below, serve to further explain various features of the invention.

FIG. 1 generally illustrates an optical system constructed and operating in accordance with the principles of the invention.

DETAILED DESCRIPTION OF THE PREFERRED EMBODIMENT

This invention provides a means to eliminate the need for in-travel in order that the focal plane of an optical system is brought to a remote viewing point, such as where the field lenses of eyepieces placed in a binoviewer can provide an in-focus image produced by the optical system, so that the image may be comfortably viewed with two eyes.

Figure 1:
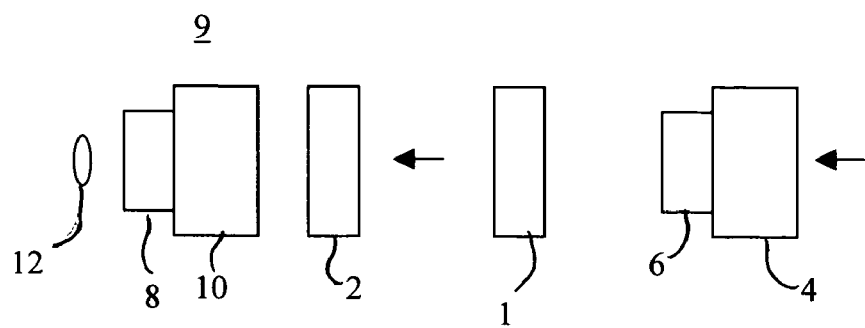

FIG. 1 generally illustrates an optical system in accordance with the principles of the invention, and comprises a modular system of two types of lenses, one being a telenegative-type of lens 1 and the other being a positive-type lens 2. A double concave lens may comprise the telenegative lens 1, and a double convex lens may comprise the positive lens 2. Since there are many different telescope designs (and the telescope may or may not use of a 90 degree star diagonal), the physical configuration of housings for these two lens systems must accommodate those many designs.

In the optical corrector apparatus of the invention, the first lens system that intercepts the light cone generated by a telescope 4 and provided at the telescope focuser tube 6, is the telenegative lens 1. Lens 1 will create an increase in focal length of the light cone passing through it, so that the focal plane will now travel further out from the focuser tube 6. The length of travel will be determined by the focal length of the telenegative lens 1. If the focal length is too great, an excess of magnification will occur. It is generally very desirable to be able to have no increase, or a very small increase (such as 1.1× to 2.0×) in magnification. The focal length of lens 1 need only be great enough so that the focal plane may reach and be relayed by the second lens 2. The focal length of lens 2, the positive lens, must be great enough so that the final image may be focused at a remote viewing device 9, such as the eyepieces 8 of a binoviewer 10 which is being used by an observer 12 to view the image generated by telescope 4. Lenses 1 and 2 are coupled together with a predetermined distance therebetween, as part of a common optical path between the telescope and the viewer. The focal length of the optical system comprising lenses 1 and 2 (and the space therebetween) should be as short as possible in order that they may bring the focal plane of the telescope out to the eyepieces 8 without creating an undesirable increase in magnification. In general, the housings supporting the lens 1 and 2 position the lenses therein so that lens 1 is positioned as close as possible to the focuser tube 6, and lens 2 is positioned as close as possible to the image input of the binoviewer 10. It should be noted that although a binoviewer 10 is shown for use with the optical system of the invention, it is not necessary that the remote viewing device be a binoviewer, and in fact other remote viewing devices are possible, such as a camera.

For proper operation of the optical corrector system of the invention, there must be a certain amount of spacing between lenses 1 and 2. If lens 1 is of a certain optical power such as negative 150 mm focal length, then it will increase the focal length of the optical system so that the focal plane will now fall beyond a point where the focal plane would have occurred had the telenegative lens 1 not been used. This will result in the real image being placed further from the primary mirror or refracting objective. Accordingly, the focal plane will now fall beyond lens 2. Thus, lens 2 will further manipulate the light cone and relay it an additional length and reduce the magnification so that the light cone may travel through the binoviewer 10 and reach the eyepieces 8. If lens 2 has sufficient focal length to project the image relayed to it by lens 1 (such as a positive focal length of 75 mm and a sufficient spacing of about 3.5 inches is provided between lenses 1 and 2, then an image will be focused at the retina of the observer 12 when viewing through the eyepieces 8 in the binoviewer 10. Specific details of the focal length, lens spacing and lens diameter is provided at the end of this specification.

As noted above, the physical embodiment of these two lenses must also be configured so that the corrector system may be adapted for use in a variety of telescopes. Since some telescopes necessitate the use of 90 degree star diagonals, the optical corrector system of the invention must be usable with a 90 degree angle optical accessory such as the star diagonal. Furthermore, there are telescopes of various varieties like Newtonian Telescopes that do not involve the use of star diagonals, and the physical configuration of the optical corrector system of the invention must also accommodate these types of telescopes as well.

Accordingly, the modular construction of the optical corrector system of the invention allows for either a straight linear alignment of the lens 1 and 2, or a 90 degree alignment of these lenses when they are used with a star diagonal. This modular construction allows one optical corrector system to be used for many types of telescopes such as Schnmidt Cassagrains (SCTs), Classical Cassagrains, Refractors, Maksutovs, Ritchey Chreitens, Klestovs and Newtonian telescopes to name just a few, for the purpose of moving the image plane out to the binoviewer while not creating excessive magnification, and providing a means for the user to vary magnification from low to higher, if desired.

Figure 2:
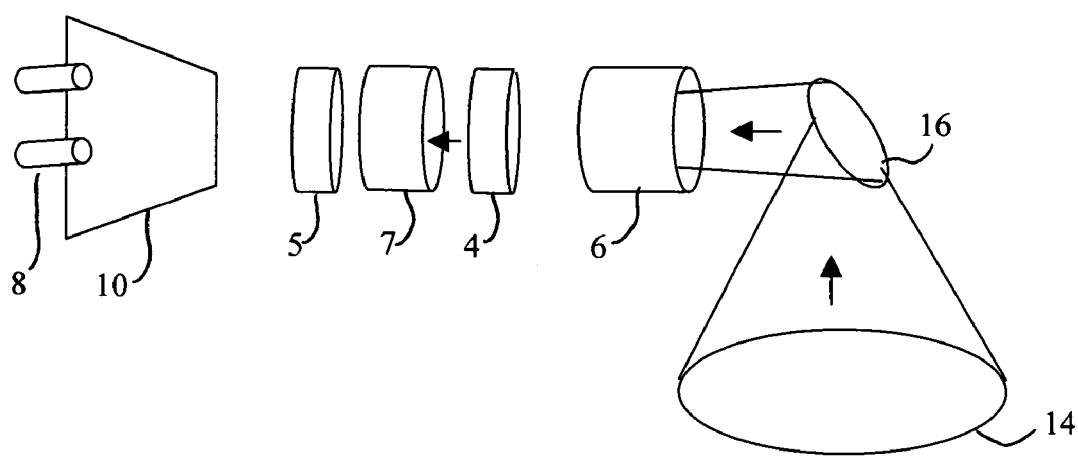
FIG. 2 illustrates one embodiment of an optical system in accordance with the principles of the invention for use with a Newtonian Reflector type telescope.

FIG. 2 generally illustrates an optical system in accordance with the principles of the invention for use with a Newtonian Reflector type telescope, which couples the image plane out to a binoviewer without producing excessive magnification.

As shown therein, a primary mirror 14 of a reflecting telescope system produces a converging light cone which is intercepted and deflected at a right angle by a secondary mirror 16 so that the focal plane is placed within the focuser 6 of the telescope. Then, in accordance with the general operation of the invention as described in FIG. 1, the light cone provided by focuser 6 is intercepted by a housing 4 containing the telenegative lens 1 and from there passes through a hollow coupling/spacer housing 7, and then transferred by a housing 5 containing the positive lens 2, to the image input port of the binoviewer 10. The focal plane then passes through the optical path of the binoviewer 10, so that eyepieces 8 placed in receptacles on viewer side of binoviewer 10 may intercept the focal plane and bring a focused image to the eyes of the user with no or only minimal power gain. For making the couplings between these various optical components, conventional coupling techniques may be used, such as appropriately matched sets of male and female threads. Position locking, if needed, can be accomplished by using a threaded locking ring, or a set screw.

Figure 3:
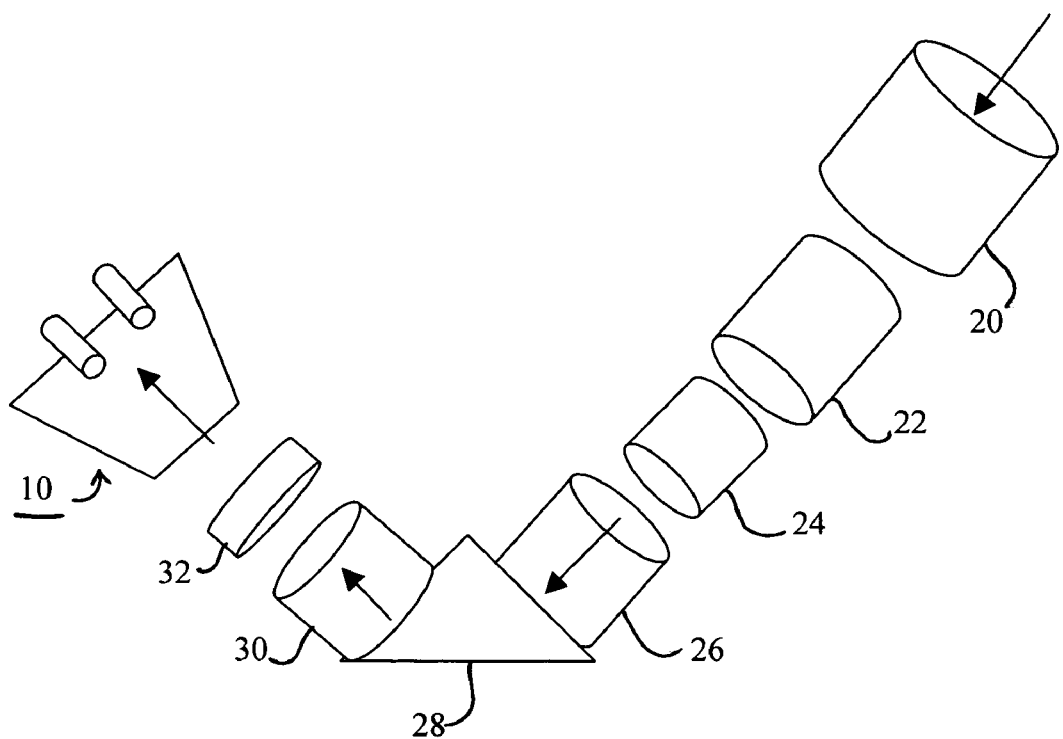
FIG. 3 illustrates an embodiment of the optical system in accordance with the principles of the invention adapted for use with Refracting telescope that uses a star diagonal.

FIG. 3 illustrates an embodiment of the invention adapted for use with a Refracting telescope that uses a star diagonal, for coupling the image plane out to the eyepieces of a binoviewer without producing excessive magnification. As well known, the star diagonal allows the observer to view the image plane at a comfortable angle. As shown therein, light (represented by the arrow) that enters the telescope passes through an objective lens 20 and then on to a focusing tube 22 at an opposing, light output, end of the Refracting telescope. Lens 20 produces a converging cone that eventually culminates in an image plane. A cylinder 24 housing the telenegative lens 1 is connected between a receptacle at the output of the focusing tube 22 and an input receptacle 26 at the light input side of a star diagonal 28. The star diagonal 28 contains the conventional flat reflective internal mirror at the bottom thereof, not shown, which deflects the incoming light cone in an upward direction, through an output receptacle 30 thereof. A cylinder 32 housing the telenegative lens 1 is connected between output receptacle 30 of the star diagonal 28 and the image input port, typically a female threaded opening, of the binoviewer 10, so that the image plane created by the Refracting telescope is relayed to the eyepieces of the binoviewer 10 with a minimum of magnification. Coupling between these various optical components can be provided by the conventional coupling techniques noted above, such as appropriately matched sets of male and female threads. Alternatively, a sliding fit of appropriately sized concentric cylinders could be used, with position locking being accomplished by one or more set screws. This second technique may be particularly advantageous in this embodiment describe below.

That is, in this embodiment of the invention, in order to keep the spacing between the positive and telenegative lenses at a minimum, it is desirable that the telenegative lens 1 be positioned at a lower end of the cylindrical housing 24 and furthermore, that the diameter of housing 24 be somewhat less than the diameter of input receptacle 26, so that housing 24 can be recessed within input receptacle 26 so that lens 1 to positioned as close to the internal mirror of the star diagonal 28 as possible. Once fully recessed in receptacle 26, housing 24 can be locked in place using a set-screw technique, or an appropriately matched set of threads on the mating surfaces between receptacle 26 and housing 24.

Figure 4:
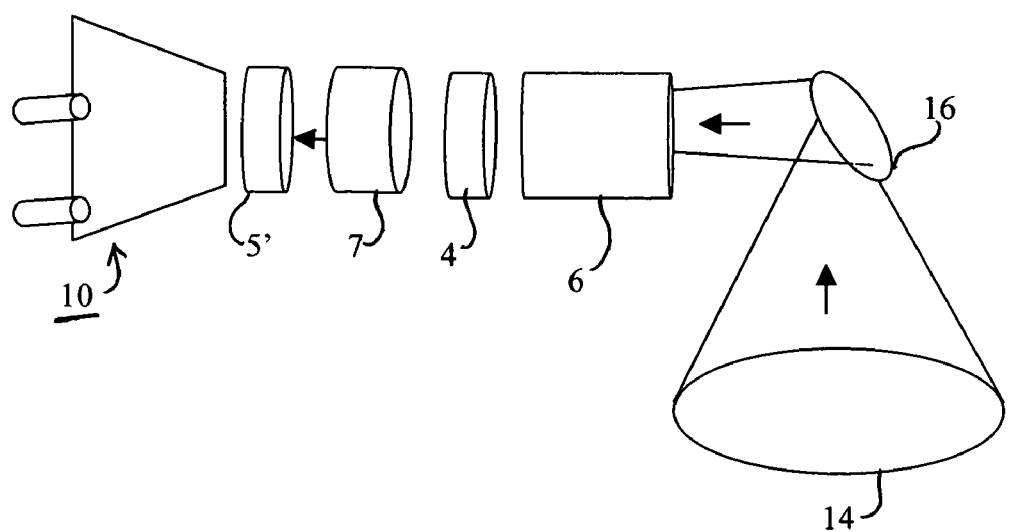
FIG. 4 illustrates a variation of the inventive optical system shown in FIG. 2, which produces higher image magnification for the user.

FIG. 4 illustrates a variation of FIG. 2, where the cylinder 5 with positive lens 2 is replaced by a hollow cylinder 5' which does not have the positive lens 2 included therein. The effect of this arrangement is that the user is provided with the option of having higher image magnification power provided by the optical coupling system when hollow cylinder 5' is used, while the image plane is still brought to focus at the eyepieces 8 of the binoviewer 10.

Figure 5:
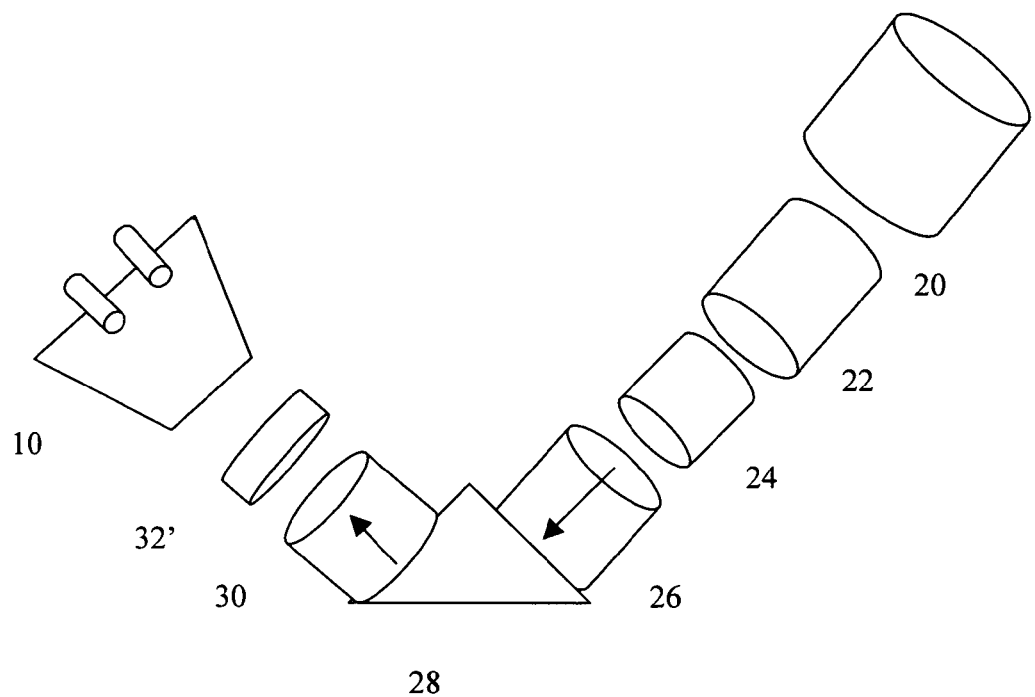
FIG. 5 illustrates a variation of the inventive optical system shown in FIG. 3, which produces higher image magnification for the user.

FIG. 5 is a variation of the FIG. 3 embodiment, where the housing containing the positive lens is removed so that a moderately high magnification will result, while the image plane will still be relayed successfully to the eyepieces in the binoviewer 10. In this embodiment, the cylinder 32 of FIG. 3 containing the positive lens is replaced with a hollow cylinder 32' containing no lens (1). The coupling techniques used for cylinder 32' could be the same as used for cylinder 32.

Figure 6:
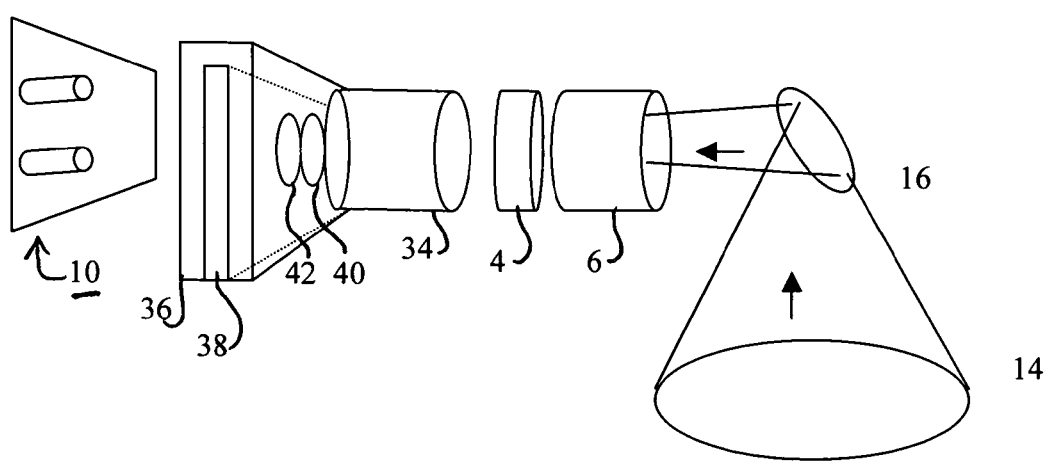
FIG. 6 illustrates a variation of the inventive optical system, as applied to the embodiment shown in FIGS. 2 and 4, which simplifies the process required by the user for selectively switching between higher and lower image magnification.

FIG. 6 is a variation which is a combination of the FIG. 2 and FIG. 4 embodiments, where alternate replacement of cylinder 5 with cylinder 5' in order that the image plane is relayed to the binoviewer 10 with selectable low or high power, allowing the user to more easily select the magnification of the final focused image. In the representative embodiment shown in FIG. 6 the cylindrical housing 4 containing the telenegative lens 1 connects the telescope focuser 6 to a cylinder input 34 of a housing 36. The image output of housing 36 is coupled to the image input port (nosepiece) of the binoviewer 10. Coupling between these various optical components can be provided by the conventional coupling techniques noted above, such as appropriately matched sets of male and female threads, and an adapter ring, if needed, between the output of housing 36 and the nosepiece of binoviewer 10. Housing 36 includes a sliding cartridge 38 which is selectively positionable within housing 36 to first and second detent positions, at which a selective one of respective first and second apertures 40 and 42 are aligned with the optical path through housing 36. The construction and operation of detents are well known, and accordingly they are not specifically shown. The positive lens 2 is mounted in one of the apertures 40 or 42, and the other aperture is left optically neutral. With the present arrangement, the user merely has to slide cartridge 38 between one detent position and the other in order to enjoy using the binoviewer 10, with either a low magnification when lens 2 is also in the optical path, or alternatively with a higher magnification when lens 2 is removed from the optical path.

Figure 7:
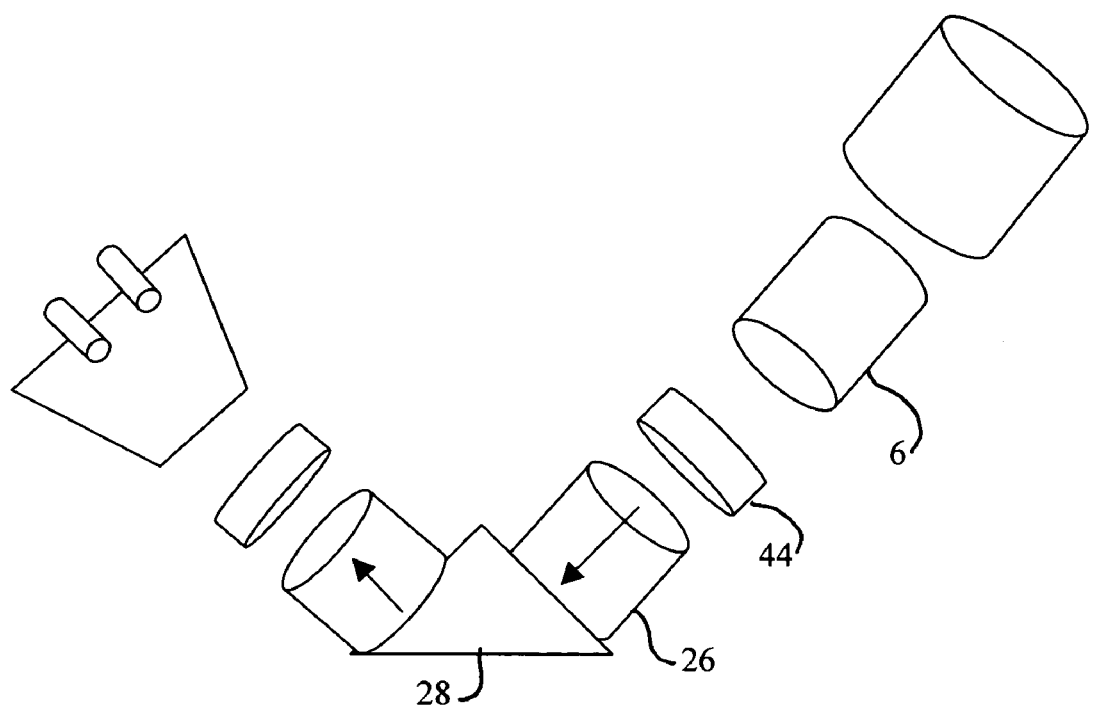
FIG. 7 illustrates a variation of the inventive optical system shown in FIG. 3 or 5, where the star diagonal of the Refracting telescope is not able to have recessed therein the telenegative lens component of the optical system.

FIG. 7 is a variation of the FIG. 3 embodiment, useful when the receptacle 26 of the star diagonal does not allow the telenegative lens 1 to be recessed therein, in order to minimize spacing between positive and negative lenses. As shown herein, a cylindrical housing 44 containing the telenegative lens 1 is of the generally the same diameter as that of receptacle 26 of the star diagonal 28 and the focuser tube 6 of the telescope, between which the housing 44 is coupled. One arrangement for coupling cylinder 44 in such position is by use of appropriate male and female matching threads at the mating ends of the respective components. If needed, adapter rings with internal and/or external threads can be used to match the opposed ends of adjacent ones of these threaded components together.

It is noted that since most Newtonian Reflecting telescopes have been configured so that the secondary mirror size is minimized, hence reducing aberrations due to the central obstruction as much as possible, the image plane produced by such a system falls within the focusing tube. This design constraint is well known to those familiar in the art of Newtonian telescope making. It is known that such scopes are also used by a large number of users for photographic purposes. Even though these telescopes are not designed for photographic purposes, it would be desirable for the image plane to be relayed to the film plane of a camera, so that a focused image can be achieved on film negatives or digital chips. In the past, a telenegative lens has been used to achieve this. However, the magnification increase created by the use of the telenegative lens decreases the true field of the object being photographed. Since many astronomical objects cannot be fully framed due to such a decrease in field size, it would be desirable to find an alternative method of relaying the image plane of the Newtonian telescope (or those telescopes with similarly fixed focal planes), without the introduction of a large increase in magnification.

Figure 8:
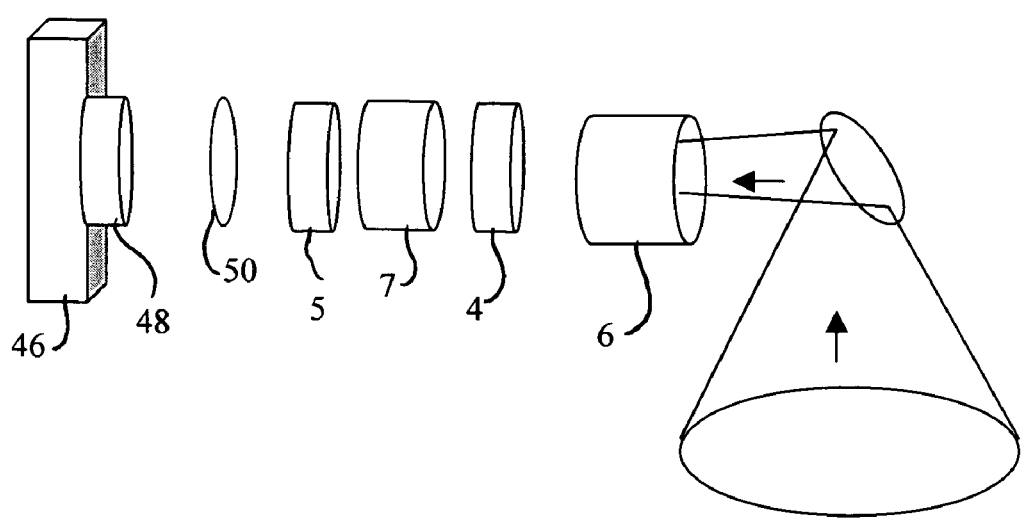
FIG. 8 illustrates a variation of the inventive optical system, as applied to the embodiment shown in FIG. 2, which couples the image plane to a camera instead of a binoviewer.

FIG. 8 illustrates use of the corrector system of the invention to relay the image plane of the telescope to the film plane of a camera 46, without creating high image magnification.

Image relay to the film plane of camera 46 is shown as a variation of the previously described FIG. 2 embodiment. For relaying the image plane of the telescope to the film plane of the camera 46, one end of the housing 4 containing the telenegative lens 1 is connected to the focus tube 6 of the telescope, the opposite end of housing 4 is connected to the housing 5 containing the positive lens 2. The opposite end of housing 5 is connected to the image input port 48 of camera 46. If needed, an appropriate camera adapter 50 can be used to provide the coupling between housing 5 and input port 48 of the camera. This system results in a very low magnification increase for the image relay system, so that the image plane of the telescope can be successfully relayed to the film plane of the camera. As noted above for the other embodiments, if needed, adapter rings with internal and/or external threads can be used to match the opposed ends of adjacent ones of these threaded components together.

In the foregoing embodiments, such as in FIG. 2, if the focuser tube has a 2 inch diameter, the telenegative lens 1 would preferably also have a 2 inch diameter and a 200 mm negative focal length, although a focal length of negative 150 up to negative 250 could be used. The positive lens 2 would preferably also have a 2 inch diameter and a 175 mm positive focal length (although a focal length of 150-300 mm could be used). The distance between the lenses would preferably be about 3.5 inches, although a distance of 3-5 inches could be used. For embodiments of the invention using a star diagonal, such as shown in FIG. 3, lens 2 could be 250 mm positive, lens 1 could be 200 mm negative, and the spacing provided by the internal mirror of the star diagonal is typically 4". For telescopes with a 1¼ inch diameter focus tube, 1¼ inch diameter modular optical corrector components and binoviewer would be used. For telescopes with a 2 inch diameter focus tube, 2 inch diameter modular optical corrector components could be used, but with appropriate "step-down" adapters, 1¼ inch modular optical corrector components and 1¼ inch diameter binoviewer could also be used.

Many telescopes utilize 2" diameter focuser tubes. Newtonian telescopes using such focuser tubes known to those familiar in the art of amateur astronomy, allow use of larger format eyepieces, which in turn allow wider fields of view to be obtained if suitable large format eyepieces are used. The light cone created by the primary mirror begins to converge immediately after it is formed. This is because it will culminate as a focal plane which is a real image. This focal plane will be produced at a specific distance from the primary mirror. This distance may be stated as the "focal point" and will be formed as a real image at a distance that is equal to the actual focal length of the objective. The focal length is determined by the figure or curve of the primary mirror surface. The curve may be stated as a ratio of the primary mirror diameter, so that a 20" diameter mirror created with a surface curve resulting in a focal ratio of F/5, would produce a focal plane at a distance of 100 inches from the surface of the primary, or at a distance that is 5 times the diameter of said primary mirror. Mirrors with faster ratios or with focal planes that occur at closer distances to the primary mirror of a given diameter are more compact than other telescopes, so their use is widespread, as also well known to those familiar in the art of amateur astronomy. Although a large primary mirror gathers a lot of light, produces brighter images and also allows greater resolution of small features such as those seen on planet surfaces, if the telescope is to remain reasonably compact, the focal ratio must remain fast if a telescope with a large mirror is to be reasonably compact and portable. The resulting light cone culminating in the focal plane must therefore be steep in its convergence rate in comparison to a telescope with a long focal length and slow ratio. Because the Optical Corrector System (OCS) of the invention as applied to Newtonian telescopes must intercept the light cone before a focal plane and real image is formed, the light cone is wide in such Newtonian telescopes. Because of this, use of larger format (i.e., diameter) optical elements in the OCS creates numerous optical advantages when used with such a telescope system. For example, a larger front element (housing a negative lens) will allow more of the light cone to be intercepted that includes rays that occur off-axis. As a result, eyepieces used in the binoviewer will be more fully illuminated because off-axis rays are now allowed to contribute to the image created when the eyepiece intercepts the focal plane that is now being transferred to the eyepieces by the OCS. Almost all Newtonians with diameters larger than 10 inches utilize primary mirrors with fast focal ratios of F/5 or faster. Newtonians with mirrors of 18 inches diameter or greater often utilize primary mirrors with focal ratios in the F/4 to F/4.3 range. The very steep light cones of these telescopes create the need for such a large format front element in the OCS since the OCS must intercept the light cone before the focal plane and the real image are formed. Ray tracing programs can show that a large percentage of light rays formed by a primary mirror of fast focal ratio will not contribute to the final real image if those light rays occur outside of a central axis and if such peripheral light rays are not integrated into the real image by allowing them to pass through the front optical element of the OCS. Those peripheral light rays will be cutoff and produce a falloff of illumination in the field of view rendered by the eyepieces. This is know as falloff of illumination and in it's severest form, is known as vignetting to those familiar in the art of amateur astronomy.

An additional optical advantage that is realized when using a 2" format OCS is that the perpendicular orientation of the optical elements in the OCS in relation to the light cone is better maintained. This is due to the increased surface area of the 2" diameter housing of the OCS. Because a binoviewer and its two eyepieces weigh several pounds, there is a tendency of such a load to droop if the OCS diameter is a 1.25" format. With the interior aperture of a 2" to 1.25" adapter being 1.25", there is less surface area that is interfacing with the interior walls of a 1.25" format OCS.

A 1.25" adapter will usually have a rather large tolerance in that 1.25" measurement of the aperture and movement of the 1.25" OCS within the aperture of such an adapter may allow the front element of a 1.25" format OCS to deviate from a perpendicular position in relation to the light cone of the primary mirror being intercepted. In a 2" format OCS, this tendency is greatly mitigated because there is no need for the step-down adapter. In the 2" all of the components of the OCS system, beginning with the front element housing the telenegative lens 1, may be inserted into the 2" focuser tube of the telescope directly, allowing the OCS optical elements to reside therein and locked therein with the binoviewer flush with the end of the focuser tube, and then a set screw on the outside of the focuser tube can lock the OCS in position. Thus, the OCS system will remain square with the optical axis of the telescope, which will result in less aberrations. There is also a clear ergonomic advantage in terms of increased stability that will result from use of the 2" format OCS for Newtonian telescopes. The Binocular viewer and 2" format of the entire OCS system of housings (housings 4, 5 and 7 of FIG. 2) mate with the telescope more efficiently than the 1.25" system and there is a more solid feel, important to those familiar with the art of amateur astronomy.

While the present invention has been disclosed with reference to certain embodiments and variations, numerous other modifications, alterations and changes to the described embodiments are possible without departing from the sphere and scope of the present invention.

For example the general description of the modular optical components of the invention as described above can be advantageously used with a Schmidt Cassagrain Telescope (SCT) in a particular way to significant advantage. When an SCT is used with a binocular viewer, the action of moving the primary mirror toward the secondary mirror pushes the focal plane out far enough so that the binocular viewer can reach focus. It is this ability to push the focal plane out of the SCT that makes it possible for a binocular viewer to reach focus when a focal reducer lens is also used. More specifically, in one embodiment of the invention, only the housing supporting the positive lens 2 is used, and the housing supporting the negative lens 1 is not used. In this case, the housing supporting the positive lens 2 is coupled between the input of the binoviewer 10 (such as by directly threading into the binoviewer nosepiece) and the image output of the star diagonal. In this configuration of the invention, the housing supporting the positive lens 2 serves as a focal reducer element. This allows the effective focal ratio to be faster due to the focal reducing properties of the positive lens that result when placing the positive lens in the optical path in such a manner. This also creates wider fields of view than are possible with other systems. Even furthermore, it may be desirable to use only the telenegative lens 1, by placing it at the image input of the star diagonal, thereby providing the user the option of high power viewing.

Additionally, with a further component called a variable adapter, the positive lens can be located at a user selectable, i.e, varying, distance, thereby allowing varying amounts of focal length reduction to take place. This also ensures that any SCT can reach focus. In actuality, the greater the distance between the binoviewer and the focal reducing lens (FRL), the greater the amount of focal reduction. This is desirable. However, some telescopes may not be able to reach focus if there is too great a distance between the FRL and the binoviewer. Therefore, the variable adapter is of great use so that each user may set the ideal distance of the lens element to be used, or may not use it at all, as desired.

Basically, the OCS used in Refractors will serve many telescopes that otherwise would not have the ability to relay the focal plane out to a binoviewer. As we discussed, the telenegative and positive are typically used individually on most SCTs since this telescope design has an inherent ability to move the image plane through the binoviewer. The positive lens, if attached by a means to the binoviewer, will allow focal reduction to occur so that very low power images and wide fields of view will result. If the telenegative lens is placed in a like position, the focal length will be increased and higher magnification will result.

Figure 9:
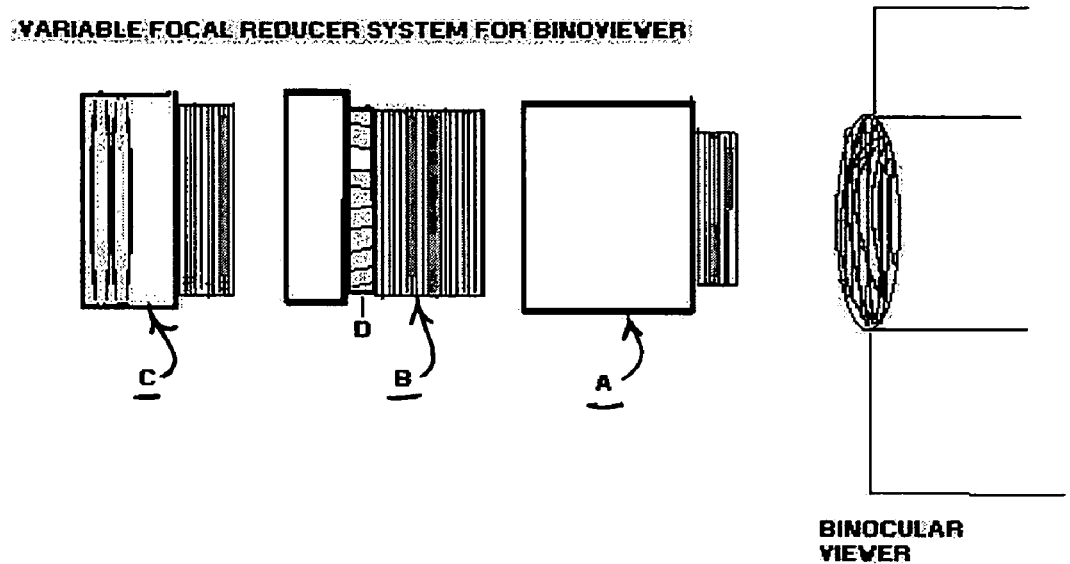
FIG. 9 illustrates a variation of the inventive optical system, as applied Schmidt Cassagrain telescope (SCT).

In this regard, FIG. 9 shows a binoviewer having a threaded female input receptacle. A component "A" is inserted into threaded binoviewer receptacle so that "A" becomes a nosepiece for the binoviewer. "A" is hollow and without an optical component. A component "C" may then be coupled to "A", either directly or indirectly, using the internal threads on part "A". Part "C" has a male threaded member with threads that mate with internal threads of part "A". As shown in FIG. 9, the positive lens (FRL) is located at an anterior section inside of part "C". When part "A" and "C" are mated in this way, focus may be achieved in any SCT. A part "B" may be used if needed, and is a variable adapter which may be placed between parts "A" and "C". Part "B" has male threads that are then threaded into the mating the internal threads of part "A", either completely or partially. Note that in the event partial threading is desired, a lock ring "D" is provided on part "B" which will lock parts "A" and "B" in firm position when that lock ring is threaded down so that it is flush with part "A". With this arrangement, as part "B" is threaded further out from part "A", a greater amount of focal reduction takes place, however, it will also be more difficult for the SCT to reach focus. Since the locking distance is determined by the user, the focal reducing factor may be set by the user to be the greatest amount possible for a given telescope. As noted above, an additional cell which is identical to part "C" but containing a telenegative lens, may be substituted for the part "C", which substitution will increase the effective focal length (EFL) of the telescope. This would allow high power applications to be utilized. Such a system greatly increases the flexibility of the telescope and eyepiece for a variety of observing applications.

Accordingly, it is intended that the present invention not be limited to the described embodiments, but that it has the full scope defined by the above language and the claims which follow, as well as equivalents thereof.

The invention claimed is:

1. An optical system which is independent of a telescope, for repositioning the focal plane of a focused image produced by the telescope from a point where it would conventionally be viewed by a user of the telescope, to a point where the focused image is to be viewed by a user of a remote viewing device used in combination with the telescope, the remote viewing device being of the type that has an image input portion for receiving the focused image and an image output portion at which the user can view the focused image, and a significant amount of lightpath therebetween, the independent optical system comprising:
   a first housing having first and second opposed ends, said first housing supporting therein a telenegative-type lens, and
   a second housing having first and second opposed ends, said second housing supporting therein a positive-type lens, wherein,
   the first end of the first housing is adapted to be coupled to said telescope in a manner so that the telenegative lens intercepts the image plane provided thereby,
   the first end of the second housing is adapted to be coupled to the image input portion of said remote viewing device, and
   the second end of the first housing and the second end of the second housing are adapted to be coupled to each other in a manner so that the distance between the telenegative lens in the first housing and the positive-type lens in the second housing results in the intercepted image plane being repositioned from the viewing position where it would conventionally be viewed by a user of the telescope, to a viewing position substantially increased therefrom and which is at the image output portion of the remote viewing device; and furthermore,
   wherein said independent optical system does not include the remote viewing device.

2. The optical system of claim 1, wherein the repositioning of the image plane results in a magnification change of the image presented to the binoviewer which is less than 2 times the image provided by the telescope.

3. The optical system of claim 1, wherein the remote viewing device comprises a binoviewer.

4. The optical system of claim 1, wherein the remote viewing device comprises a camera.

5. The optical system of claim 1, wherein the first and second housings are adapted for connecting to opposed ends of a hollow housing having no optical component therein, which hollow housing provides a desired spaced coupling between the second ends of the first and second housings.

6. The optical system of claim 1, wherein the first and second housings are adapted for connecting to opposed ends of a star diagonal optical coupling element, which star diagonal provides the coupling between the second ends of the first and second housings.

7. The optical system of claim 1, wherein the first and second housings are adapted for being mechanically coupled to a coupling element positioned as a spacer therebetween using an attachment technique that allows selective mechanical detachment, the attachment technique being the use of at least one of matching threads or a sliding fit with set-screw.

8. The optical system of claim 7, wherein at least one of the first and second housings uses an attachment technique including threads formed on either an internal or external portion of the housing.

9. The optical system of claim 1, wherein the first and second housings are cylindrically shaped, and are adapted for being connected to a respective cylindrical coupling receptacle at opposed ends of a star diagonal optical coupling element, which star diagonal optical coupling element provides said coupling between the first and second housings.

10. The optical system of claim 9, wherein the first cylindrical housing has a diameter which allows it to be inserted into and recessed within the respective cylindrical coupling receptacle of the star diagonal optical coupling element.

11. The optical system of claim 10, wherein the lens in the first cylindrical housing is positioned near the second end thereof, so that when the second end of the first housing is inserted into the coupling receptacle of the star diagonal, the negative lens is positioned in close proximity to a reflecting mirror portion of the star diagonal.

12. The optical system of claim 11, wherein the second end of the first cylindrical housing is secured to the coupling receptacle of the star diagonal using an attachment technique that allows selective detachment, such as by us of threads a set-screw or a combination thereof.

13. The optical system of claim 1, wherein the second housing is adapted for allowing a user of the housing to selectively remove the positive lens from the optical path between the first and second ends thereof, without removing the second housing from the optical path.

14. The optical system of claim 13, wherein the second housing includes a lens carrier that can selectively reposition the positive lens from into and out of the optical path.

15. The optical system of claim 14, wherein the lens carrier comprises a sliding member that has two linearly spaced portions which can be selectively positioned into alignment in the optical path, one portion holding the positive lens, and the other portion being optically neutral.

16. A method of using a modular optical system which is independent of a telescope, the independent modular optical system being of the type that repositions the focal plane of a focused image produced by the telescope from a point where it would conventionally be viewed by a user of the telescope, to a point where a focused image is viewed by a user of a remote viewing device used in combination with the telescope, the remote viewing device being of the type that has an image input portion for receiving the focused image and an image output portion at which the user can view the focused image, and a significant amount of light-path therebetween, the independent modular optical system including a first housing having first and second opposed ends and supporting therebetween a telenegative-type lens, and a second housing having first and second opposed ends and supporting therebetween a positive-type lens, and said independent modular optical system not including the remote viewing device, comprising the following steps, coupling the first end of the first housing to a telescope in a manner so that the telenegative lens intercepts the image plane provided by the telescope, coupling the first end of the second housing to the image input portion of the remote viewing device, and coupling the second end of the first housing and the second end of the second housing to each other in a manner so that the distance between the telenegative lens in the first housing and the positive-type lens in the second housing results in the intercepted image plane being repositioned from the viewing position where it would conventionally be viewed by a user of the telescope to a viewing position substantially increased therefrom and is at the image output portion of the remote viewing device.

17. The method of claim 16, wherein for providing a user desired image magnification of the repositioned image, the user removes the second housing supporting the positive-type lens from the optical path between the telescope and the remote viewing device.

18. The method of claim 16, wherein for providing a user desired image magnification of the relayed image, the user operates a selectively positionable member in the second housing which selectively removes the positive-type lens from the optical path between the telescope and the remote viewing device.

* * * * *